United States Patent
Madsen

(10) Patent No.: US 12,459,166 B2
(45) Date of Patent: Nov. 4, 2025

(54) RESIN DEGASSING

(71) Applicant: LM WIND POWER A/S, Kolding (DK)

(72) Inventor: Kristian Lehmann Madsen, Kolding (DK)

(73) Assignee: LM WIND POWER A/S, Kolding (DK)

( * ) Notice: Subject to any disclaimer, the term of this patent is extended or adjusted under 35 U.S.C. 154(b) by 498 days.

(21) Appl. No.: 17/912,672

(22) PCT Filed: Mar. 19, 2021

(86) PCT No.: PCT/EP2021/057130
§ 371 (c)(1),
(2) Date: Sep. 19, 2022

(87) PCT Pub. No.: WO2021/186055
PCT Pub. Date: Sep. 23, 2021

(65) Prior Publication Data
US 2023/0150173 A1    May 18, 2023

(30) Foreign Application Priority Data
Mar. 20, 2020    (GB) ..................................... 2004066

(51) Int. Cl.
*B29C 37/00* (2006.01)
*B01D 19/00* (2006.01)
(Continued)

(52) U.S. Cl.
CPC ........ *B29C 37/006* (2013.01); *B01D 19/0036* (2013.01); *B29B 2013/005* (2013.01); *B29C 70/48* (2013.01)

(58) Field of Classification Search
None
See application file for complete search history.

(56) References Cited

U.S. PATENT DOCUMENTS

| | | |
|---|---|---|
| 5,409,523 A | 4/1995 | Haeuser |
| 5,591,252 A | 1/1997 | Haeuser |
| | (Continued) | |

FOREIGN PATENT DOCUMENTS

| | | | |
|---|---|---|---|
| CN | 209191350 U | 8/2019 | |
| DE | 10018856 C1 * | 11/2001 | ............. B01F 13/06 |
| | (Continued) | | |

OTHER PUBLICATIONS

DE10018856C1_ENG (Espacenet machine translation of Terhardt) (Year: 2021).*

*Primary Examiner* — Gabriel E Gitman
(74) *Attorney, Agent, or Firm* — Nath, Goldberg & Meyer; Jerald L. Meyer; Tanya E. Harkins

(57) ABSTRACT

Disclosed are processes and systems for degassing liquid resin. Resin is provided at a resin inlet and pumped into a first duct using a resin pump to achieve a first absolute pressure of at least 1.6 bar in the first duct; the resin pump and/or a flow control valve are configured to achieve a first pressure drop across the flow control valve of at least 1.5 bar; a second duct communicates the resin from the flow control valve to a storage tank; a gas evacuation system maintains a pressure in the storage tank below 100 mbar at least partly concurrently with pumping resin into the first duct.

21 Claims, 2 Drawing Sheets

(51) Int. Cl.
*B29B 13/00* (2006.01)
*B29C 70/48* (2006.01)

(56) References Cited

U.S. PATENT DOCUMENTS

| | | | | |
|---|---|---|---|---|
| 6,344,160 | B1* | 2/2002 | Holtzberg | B29C 67/241 |
| | | | | 264/102 |
| 2014/0013947 | A1* | 1/2014 | Liu | B01D 19/0036 |
| | | | | 96/174 |
| 2015/0343329 | A1* | 12/2015 | Jensen | B29B 13/00 |
| | | | | 96/194 |
| 2015/0360148 | A1* | 12/2015 | Loviat | B29B 7/845 |
| | | | | 203/30 |
| 2016/0143331 | A1* | 5/2016 | Inoue | A23L 33/16 |
| | | | | 514/5.5 |
| 2016/0243466 | A1* | 8/2016 | Skoglund | B01D 19/0036 |

FOREIGN PATENT DOCUMENTS

| | | |
|---|---|---|
| EP | 2353826 A1 | 8/2011 |
| EP | 2609975 B1 | 11/2016 |
| EP | 3375505 A1 | 9/2018 |

\* cited by examiner

RESIN DEGASSING

This is a National Phase Application filed under 35 U.S.C. 371 as a national stage of PCT/EP2021/057130, filed Mar. 19, 2021, an application claiming the benefit of Great Britain Application No. 2004066.3, filed Mar. 20, 2020, the content of each of which is hereby incorporated by reference in its entirety.

The present disclosure relates to degassing of resins, in particular resins for fibre-reinforced composite materials, such as fibre-reinforced composite materials for use in wind turbine blades.

BACKGROUND

As wind turbines and wind turbine blades increase in size, the risk of lighting striking the wind turbine increases. It is therefore of increasing interest to provide wind turbines and in particular wind turbine blades with the maximum possible strength.

Gas and water in resins can negatively impact the strength of fibre-reinforced materials based on such resins. Thus, there is a need for a system that is capable of providing resin with as little gas content as possible.

Current degassing systems are based for instance on boiling, heating, membranes configured for degassing, chemical degassing, and vacuum degassing.

Voids in the end product negatively affects the mechanical properties, including strength and the quality of the surface of the end product. Such voids may result for several reasons. Composites manufactured using evacuation, such as by vacuum-assisted resin transfer moulding (VARTM), the reduced absolute pressure, routinely below 30-300 mbar, can cause creation of relatively large pockets of gas that was dissolved in the resin before infusion. In that case, a post-infusion process is needed. Although this process ultimately results in a strong product that meets the specifications, the process is very time-consuming. It is therefore desirable to reduce the need for this additional manufacturing step, or at least reduce the need for it.

By exposing the resin to a reduced absolute pressure, the solubility of gases decreases. Reducing the absolute pressure also causes bubble formation, which allows removal of much of the gases. However, gases may still be dissolved in the resin, but the amount of gas can be too small for it to escape out of suspension for instance by formation of bubbles. These remaining gases as well as any water negatively affect the mechanical properties of the end product. Some existing methods deliberately add gas to the resin before performing the degassing process.

It is therefore an object of the present invention to provide an alternative system process for removing gases and water from resin, such as a process that may be more efficient than existing processes in one or more ways.

SUMMARY OF THE INVENTION

In a first aspect, the invention provides a process for degassing a liquid resin in a degassing system, the degassing system comprising:
a first duct having a resin inlet for receiving liquid resin to be degassed,
a resin pump for pumping liquid resin into the first duct via the resin inlet,
a flow control valve arranged at a downstream end of the first duct, configured to control a flow rate of resin through the first duct and configured or configurable to provide a pressure drop of at least 1.5 bar across the flow control valve,
a second duct in fluid communication with the first duct via the flow control valve,
a resin storage tank having a resin storage tank inlet in fluid communication with an outlet end of the second duct, and
a gas evacuation system operable to reduce an absolute pressure in the resin storage tank to below 100 mbar,
the process comprising:
connecting a liquid resin source to the resin inlet,
pumping liquid resin into the first duct via the resin inlet using the resin pump to achieve a first absolute pressure of at least 1.6 bar in the first duct,
configuring the resin pump and/or the flow control valve to achieve a first pressure drop across the flow control valve of at least 1.5 bar,
maintaining, using the gas evacuation system, a pressure in the storage tank below 100 mbar at least partly concurrently with pumping resin into the first duct.

Systems and processes in accordance with the first aspect of the invention can mitigate or even eliminate one or more of the issues of the prior art described above. The high absolute pressure on the input side of the flow control valve assists in creating relatively large bubbles in the liquid resin following the flow control valve. This greatly increases the efficiency with which gas in larger gas pockets are removed. Additionally, and very importantly, the pressure drop acts as a catalyst for diffusion of smaller gas pockets, and even individual gas molecules, out of the resin and into the larger bubbles, whereby they can be extracted. In prior art systems, diffusion is not an efficient mechanism for removing gas pockets in liquid resin. Embodiments of the present invention allows this mechanism to play a much larger role. In a sense, the conditions described in embodiments of the present invention cause creation of a foam-like state that is surprisingly effective in removing air and other gasses from the resin, including by way of diffusion.

Another mechanism that, under the process conditions described herein, improves the degassing process compared to known processes is the motion of the resin through the degassing system. The motion further increases the extraction of gas from the liquid resin, including very small gas pockets in the resin.

In some embodiments, the flow control valve and/or the resin pump are controlled so that an average resin transit time from the output of the flow control valve to the inlet of the storage tank is in the range 10-120 s, such as in the range 15-75 s, such as in the range 20-60 s, such as in the range 30-50 s, such as in the range 30-40 s. This has turned out to be process parameters that allow a very high degree of degassing while maintaining a high flow. Longer transit times would mean that the system would have to be unnecessarily large, and shorter transit times leave the resin insufficiently degassed.

In some embodiments, the degassing system further comprises a chamber inline between the flow control valve and the storage tank, the chamber having a smallest flow area $A_2$ which is at least 20 times a largest flow area $A_1$ of a duct portion connecting the flow control valve and the chamber. It has been found by the inventor that such an inline chamber further enhances the mechanisms described above. This allows that the system further efficiently degas liquid resin at relatively high flow rates, such as those given in various embodiments of the invention.

In some embodiments, the degassing system further comprises a duct inline between the chamber and the storage tank, said duct having a largest flow area $A_3$ which is at most $A_2/20$, such as substantially equal to the largest flow area $A_1$ of the duct portion connecting the flow control valve and the chamber. As will be described later, this may further enhance the degassing efficiency.

In some embodiments, a figure of 10 or even 5 can be used in place of 20 above, but for a high flow rate, the system then must be larger to obtain the same degree of degassing. The diffusion mechanism also turns out to be a little less efficient in such embodiments.

In some embodiments, the largest flow area $A_1$ is in the range 2-6 cm².

In some embodiments, the smallest flow area $A_2$ is in the range 130-200 cm².

In some embodiments, the largest flow area $A_1$ is in the range 2-6 cm² and the smallest flow area $A_2$ is in the range 130-200 cm².

In some embodiments, a volume of the chamber is in the range 5-50 L, such as in the range 10-40 L, such as in the range 15-25 L In some embodiments where a chamber as described above is included, the flow control valve and/or the resin pump are controlled so that an average resin transit time through the chamber is in the range 10-120 s, such as in the range 15-75 s, such as in the range 20-60 s, such as in the range 30-50 s, such as in the range 30-40 s. The volume of the chamber may be selected to obtain such transit times under the flow rates required in a given use case.

In some embodiments, the first absolute pressure is in the range 3-8 bar, such as in the range 3-5 bar. Such a condition gives a very efficient degassing while being a very manageable pressure.

In some embodiments, the first pressure drop is in the range 2.5-5.5 bar, such as in the range 2.5-4.5 bar.

Generally, the first absolute pressure is higher than the first pressure drop by an amount in the range 200-700 mbar, such as by an amount in the range 300-600 mbar. By providing a large pressure drop, the gas evacuation system needs not necessarily be powerful. For a larger system, all else being equal, a stronger gas evacuation system is needed. A high flow rate demands a higher capacity of the gas evacuation system, as more gas must be removed per unit time.

In some embodiments, the absolute pressure in the storage tank is maintained below 50 mbar. This contributes to an efficient degassing of the foam-like liquid resin prepared upstream of the storage tank in accordance with the process conditions described above.

In some embodiments, the first absolute pressure is at least 3 bar, the first pressure drop is at least 2.5 bar, the absolute pressure in the storage tank is maintained below 100 mbar. In some embodiments, a flow rate of resin into the resin inlet is in the range 20-60 L per minute.

In some embodiments, the first absolute pressure is at least 4 bar, the first pressure drop is at least 3.5 bar, the absolute pressure in the storage tank is maintained below 50 mbar. In some embodiments, a flow rate of resin at the resin inlet is in the range 20-60 L per minute.

In some embodiments, the storage tank has an outlet coupled to an outlet pump for outputting degassed resin during a first time period overlapping with pumping resin into the first duct. Such embodiments can operate inline with a manufacturing area in fluid communication with the outlet, which means that the need for storing degassed resin is strongly reduced or essentially eliminated, except for the degassing system. The high efficiency with which liquid resin is degassed in embodiments of the present invention allows such inline degassing, which in turn makes the logistics associated with providing degassed resin much simpler. The high flowrate of the system, which can be achieved by the process conditions described herein, is suitable for manufacturing large fibre-reinforced composite parts, such as wind turbine blades and aircraft fuselage and wing parts, some of which may have dimensions of more than 100 m and therefore require a large amount of resin over a relatively short period of time. The systems and methods can also be used on a smaller scale.

In some embodiments, the resin pump and/or the flow control valve and/or the outlet pump are controlled to maintain a substantially constant amount of degassed resin in the storage tank during the first time period. The latter can be achieved either by manually adjusting the system, or it can be achieved automatically based on data from the storage tank. In some embodiments, the system comprises measuring means for measuring a parameter representing the amount of degassed resin in the storage tank, and the system further comprises control means configured to receive measurements from the measuring means and control the resin pump and/or the flow control valve and/or the outlet pump to maintain the substantially constant amount of degassed resin in the storage tank. As an example, the control means may control the resin pump and the flow control valve and the outlet pump. In another example, a user controls the outlet pump in order to withdraw the amount of degassed resin necessary. In response, the control means controls the resin pump and/or the flow control valve to ensure the constant amount of degassed resin in the storage tank. The control means may also control the outlet pump, at least partly, so that the amount of degassed resin provided at the outlet is controlled at least in part by the control means. This allows the system to reconfigure to respond to a higher or lower demand for degassed resin, as opposed to the system having to respond only once resin is withdrawn, or not, from the storage tank. Instead, the system can increase or decrease pump pressure and adjust the flow control valve setting before activating the outlet pump, whereby production of degassed resin can be is initiated to replace any resin that is withdrawn from the storage tank when the control means opens the outlet pump. Similarly, when less resin is withdrawn, the resin pump and/or the flow control valve are controlled to reduce production of degassed resin.

It is noted that in relation to controlling the flow of resin into the system and/or out of the storage tank, the resin pump may be a system that comprises a valve in addition to a pump, or even several pumps, optionally coupled to the control means and controllable by the control means. Similarly, the outlet pump may be a system that comprises a valve in addition to a pump, or even several pumps, optionally coupled to the control means and controllable by the control means. Thus, the control means is coupled to and controls a number of pumps and valves in the system, which above are grouped into an "inlet pump", a "flow control valve", and an "outlet pump".

The measuring means may for instance comprise a storage tank load cell that can provide a signal representative of a weight of the storage tank including the degassed resin. As another example, liquid level measurement means, such as a pressure transducer, can be installed in the storage tank. The signal from such a transducer is directly relatable to the amount of liquid in the storage tank.

In some embodiments, the outlet is in fluid communication with a manufacturing area where a fibre-reinforced composite part, such as a wind turbine blade part, is being manufactured at least during the first time period. As described above, the present systems and method enables an inline degassing of liquid resin, whereby the challenges of producing and handling degassed resin are significantly mitigated.

In some embodiments, no gas, such as air, is provided into the resin during the degassing process, apart from the gas contained in the resin when pumped into the first duct. Some prior art relies on the addition of gas to the resin in order to improve the degassing process. Embodiments of the present invention completely eliminates the need for adding gas.

In a second aspect, the invention provides another process for degassing resin, closely related to the first aspect. The process comprises:
  providing liquid resin into a first duct to achieve a first absolute pressure of at least 1.6 bar in the first duct,
  passing the liquid resin from the first duct to a second duct through a flow control valve, wherein the first absolute pressure and the flow control valve are configured to cause cavitation on a downstream side of the flow control valve at least when the first absolute pressure is at least 1.6 bar, and
  transferring the liquid resin to a storage tank in fluid communication with the second duct and maintaining an absolute pressure in the storage tank below 100 mbar.

In some embodiments of the processes described above, the liquid resin comprises at least one of: epoxy resin, polyurethane resin, polyester resin, unsaturated polyester resin, vinyl ester resin, thermosetting resin, and/or thermoplastic resin, such as thermoplastic infusion resin.

A third aspect of the invention provides a degassing system for degassing liquid resin. The degassing system comprises:
  a first duct having a resin inlet for receiving liquid resin to be degassed,
  a resin pump for pumping liquid resin into the first duct via the resin inlet,
  a flow control valve arranged at a downstream end of the first duct, configured to control a flow rate of resin through the first duct and configured or configurable to provide a pressure drop of at least 1.5 bar across the flow control valve,
  a second duct in fluid communication with the first duct via the flow control valve,
  a resin storage tank having a resin storage tank inlet in fluid communication with an outlet end of the second duct, and
  a gas evacuation system operable to reduce an absolute pressure in the resin storage tank to below 100 mbar.

In some embodiments, the system further comprises a chamber inline between the flow control valve and the storage tank, the chamber having a smallest flow area $A_2$ which is at least 20 times a largest flow area $A_1$ of a duct portion connecting the flow control valve and the chamber.

In some embodiments, a duct inline between the chamber and the storage tank has a largest flow area $A_3$ which is at most $A_2/20$, such as substantially equal to the largest flow area $A_1$ of the duct portion connecting the flow control valve and the chamber.

A fourth aspect of the invention provides use of a process in accordance with the first or second aspect of the invention in the manufacturing of a fibre-reinforced composite part, such as a wind turbine blade part.

A fifth aspect of the invention provides use of a system in accordance with the third aspect of the invention in the manufacturing of a fibre-reinforced composite part, such as a wind turbine blade part.

The features described in relation to the first aspect of the invention may also be applied in the other aspects of the invention.

BRIEF DESCRIPTION OF THE DRAWINGS

Embodiments of the invention will be described in more detail in the following with reference to the accompanying figures. The figures show selected ways of implementing the present invention and shall not to be construed as being limiting the scope of the invention.

DETAILED DESCRIPTION OF SELECTED EMBODIMENTS

Unless otherwise indicated, the drawings are not necessarily drawn to scale.

Figure 1:
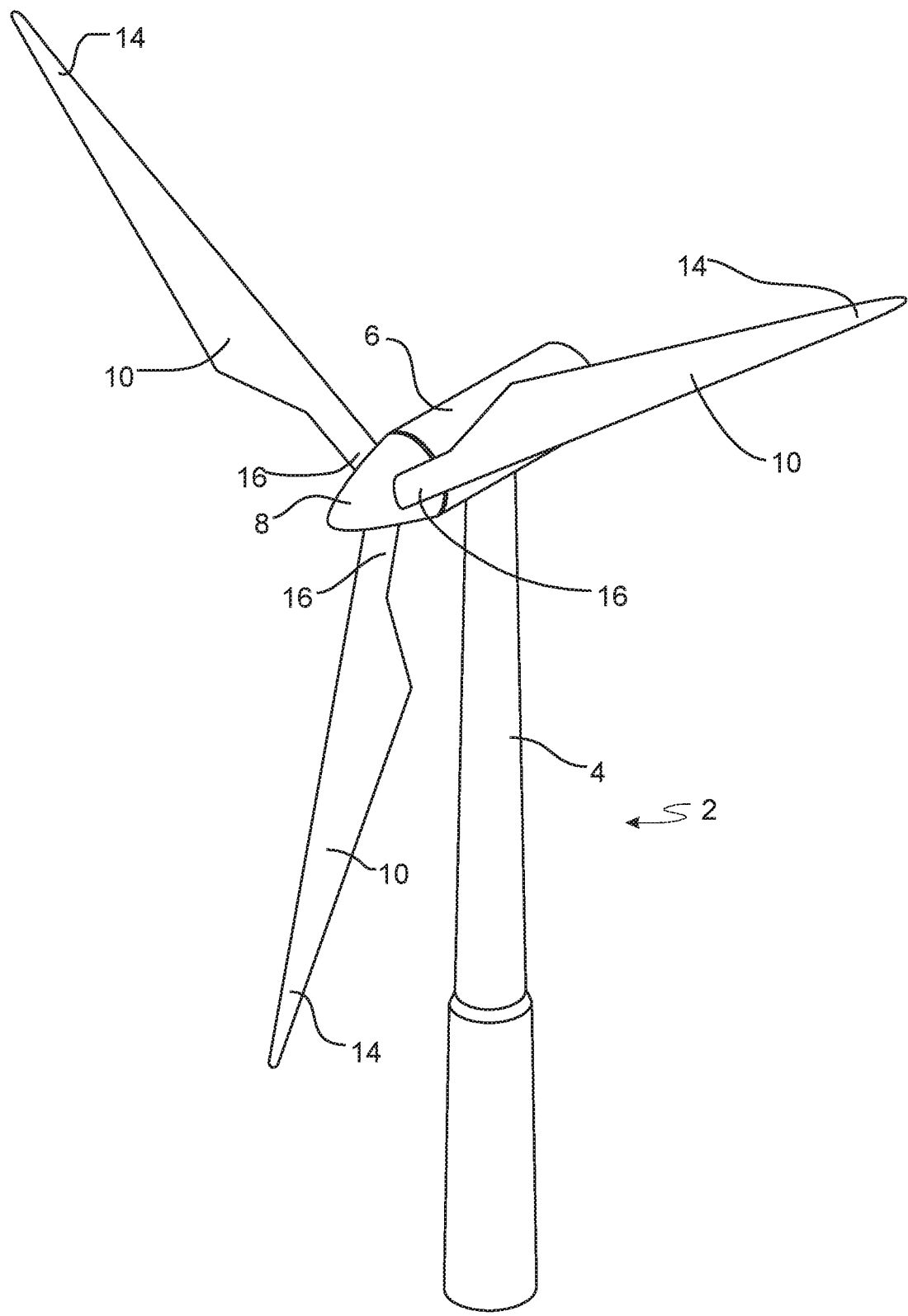
FIG. 1 is a schematic diagram illustrating an exemplary wind turbine.

FIG. 1 illustrates a conventional modern upwind wind turbine 2 according to the so-called "Danish concept" with a tower 4, a nacelle 6 and a rotor with a substantially horizontal rotor shaft. The rotor includes a hub 8 and three blades 10 extending radially from the hub 8, each blade having a blade root 16 nearest the hub and a blade tip 14 furthest from the hub 8. The invention is not limited to use in wind turbines of this type.

The blades 10 are usually made at least partly of fibre-reinforced composites, such as glass fibres and/or carbon fibres in a resin matrix. The strength of such blades is very dependent on the amount of gases and also water remaining in the resin when the fibres are impregnated with the resin, whatever the method of impregnation. It is therefore important that the resin be degassed as much as possible before use.

Figure 2:
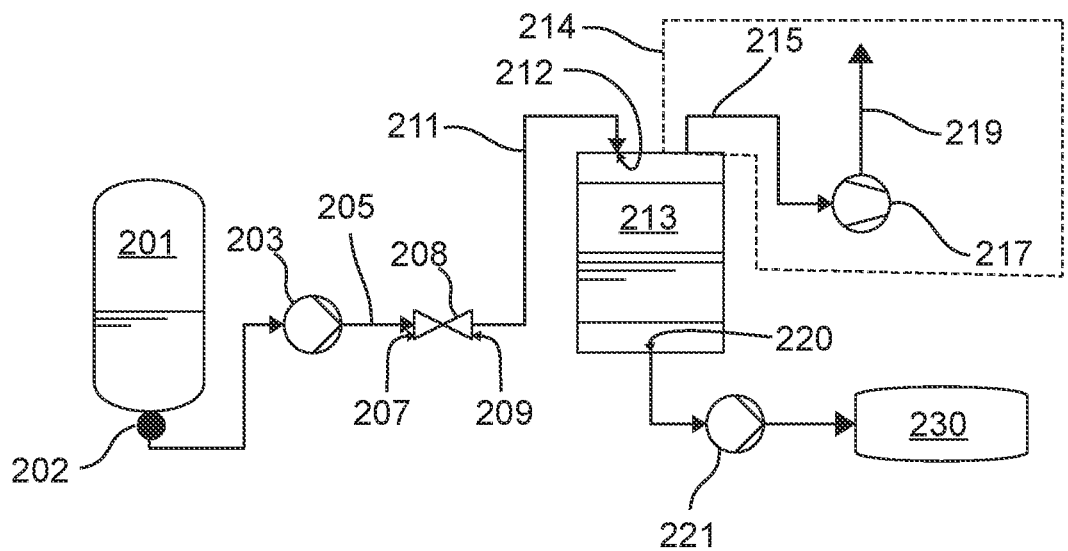
FIG. 2 is a schematic view of a system for degassing liquid resin in accordance with an embodiment of the invention.

FIG. 2 illustrates a system 200 for degassing liquid resin in accordance with an embodiment of the invention. The system comprises a first duct 205 having a resin inlet 202 for receiving liquid resin to be degassed. In the present example, the resin inlet 202 of the system 200 is connected to a resin source 201 comprising liquid resin to be degassed. A resin pump 203 pumps liquid resin from the resin source 201 farther into the system. The system also comprises a flow control valve 208 arranged at a downstream end of the first duct 205. The first duct 205 is connected to an input port 207 of the flow control valve 208. The flow control valve 208 is configured to control a flow rate of resin through the degassing system 200, particularly to provide a pressure drop of at least 1.5 bar. The resin pump 203 and/or the flow control valve 208 are controlled to allow the absolute pressure in the first duct 205 to reach a desired level and to obtain a desired pressure drop across the flow control valve 208, as will be described below. A second duct 211 is in fluid communication with the first duct 205 via the flow control valve 208. The second duct is connected to an output port 209 of the flow control valve 208. Accordingly, the absolute pressure in the second duct 211 is significantly lower than the absolute pressure in the first duct 205.

The second duct 211 connects to an inside of a resin storage tank 213 via a storage tank resin inlet 212. The inside of the storage tank 213 is also connected to a gas evacuation system 214 comprising a gas duct 215 connected to the inside of the storage tank 213, to a vacuum pump 217, and to an exhaust 219. The vacuum pump 217 is operable to maintain a low absolute pressure in the resin storage tank 213 by removing gases from the inside of the storage tank 213. The system in FIG. 2 also includes a pump 221 for pumping degassed resin to a part manufacturing area via a storage tank outlet 220. In this way, degassed resin can be provided directly to the manufacturing area. As described previously, the system 200 may even run inline, producing degassed resin while the part manufacturing is taking place.

The process of degassing resin from the resin source 201 includes pumping resin into the first duct 205 via the resin inlet 202 using the resin pump 203. The resin pump may itself comprise the inlet 202. This is a matter of design.

In the present example, the pump maintains an absolute pressure in the first duct 205 around 3 bar, at least during a substantial part of the degassing process when resin is fed through the system. The vacuum pump 217 of the gas evacuation system 214 is at the same time operated to maintain a reduced absolute pressure below 50 mbar.

This process results in a very efficient degassing of the resin, and as described previously, this is not just by traditional bubble formation. The process conditions described herein cause creation of bubbles that have a size that allows gas and water to very efficiently diffuse out of the resin. In known systems, the primary mechanism behind removal of gases and water is the formation of bubbles due to a reduced absolute pressure. The gas from such bubbles is eventually removed by a gas evacuation system. However, dissolved resin is not efficiently removed in known systems, including systems that add gas as part of the degassing process.

Embodiments of the present invention treats the resin just long enough and under pressure conditions that result in a more thorough removal of gasses and water from the resin before it reaches the storage tank 213, while maintaining a high flow rate.

The fact that the processes described herein are different from known processes is also, surprisingly, observable by evaluating the degassing system equipment after degassing liquid resin. For reasons that are not well-understood, known systems and corresponding processes cause significant build-up of residues in various parts of those systems. The build-up rate itself is rather unpredictable, and monitoring the state of the degassing system is therefore a rather time-consuming task. Removing the residue and replacing damaged parts is even more time-consuming and contributes to downtime.

The process conditions described in the present specification result in much less build-up of residues, possibly due to the foamy state of the resin and the motion of the resin through the system under the process conditions described herein. The present invention therefore makes the degassing more efficient not only with respect to the amount of residual gasses, but also with respect to the maintenance load and associated downtime.

Figure 3:
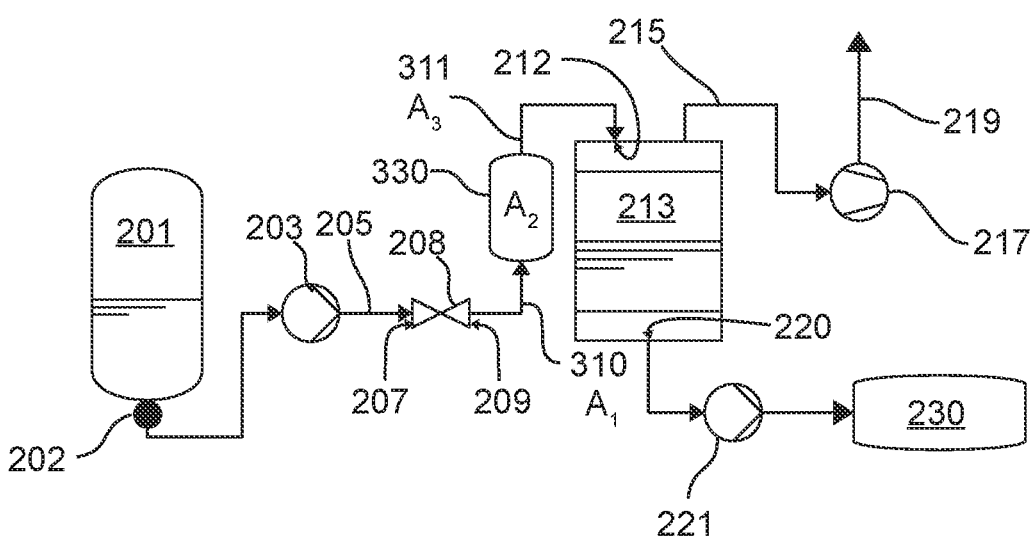
FIG. 3 is a schematic view of a system for degassing liquid resin in accordance with an embodiment of the invention.

In another exemplary process, performed in the system shown in FIG. 3, a chamber 330 modifies the flow of the resin by providing a change, in some cases a relatively large change, in the flow area between the control valve 208 and the storage tank 213. As shown in FIG. 3, the chamber 330 between the flow control valve 208 and the storage tank 213 provides a larger surface area $A_2$ for the resin compared to a largest flow area $A_1$ in the duct 310 between the control valve 208 and the chamber 330. This further contributes to removal of gasses, not just by allowing bubbles to more easily form, but also by increasing removal of gas from the resin by diffusion.

A ratio between the flow area $A_2$ and the flow area $A_1$ in the range 20-60 results in a very efficient diffusion of gasses out of the resin, including single gas molecules otherwise trapped and unable to form gas bubbles by which they can escape. The large flow area allows the resin to be in the particularly advantageous foamy state that characterizes embodiments of the present invention for a longer time.

This is further enhanced by providing that the resin after the chamber 330 flows in a relatively narrow duct 311 as illustrated in FIG. 3. It turned out that such a narrowing gives an even foamier resin in the chamber and also leads to smaller and more uniform bubbles in the chamber, which increases the rate at which small gas pockets and individual molecules diffuse out of the resin. Gasses and water trapped in very small amounts, down single molecules, as described above, can diffuse out of the resin, which allows them to be removed together with larger pockets of gas. Without the narrower duct after the chamber, bubbles tend to be somewhat larger and vary more in size, and the diffusion component of the degassing process is lower. As a consequence, more gas remains suspended in the resin especially on a molecular level.

The invention has been described with reference to selected embodiments. However, the scope of the invention is not limited to the illustrated embodiments, and alterations and modifications can be carried out without deviating from the scope of the claims.

LIST OF REFERENCES 2 wind turbine
4 tower
6 nacelle
8 hub
10 blade
14 blade tip
16 blade root
200, 300 degassing system
201 resin source
202 resin inlet
205 first duct
203 resin pump
207 flow control valve input port
208 flow control valve
209 flow control valve output port
211 second duct
212 storage tank resin inlet
213 resin storage tank after degassing
214 gas evacuation system
215 gas duct
217 vacuum pump
219 gas exhaust
220 resin outlet
221 pump to part manufacturing area
230 part manufacturing area
310 duct between control valve and chamber
311 duct between chamber and storage tank
330 chamber
$A_1$ largest flow area of first duct
$A_2$ smallest flow area of chamber $A_3$ largest flow area of duct between chamber and storage tank

The invention claimed is:

1. A process for degassing a liquid resin in a degassing system, the degassing system comprising:
   a first duct (205) having a resin inlet (202) for receiving liquid resin to be degassed;
   a resin pump (203) for pumping liquid resin into the first duct (205) via the resin inlet (202);
   a flow control valve (208) arranged at a downstream end of the first duct (205), configured to control a flow rate of resin through the first duct and configured or configurable to provide a pressure drop of at least 1.5 bar across the flow control valve (208);
   a second duct (211, 311) in fluid communication with the first duct (205) via the flow control valve (208);
   a resin storage tank (213) having a resin storage tank inlet (212) in fluid communication with an outlet end of the second duct (211, 311);
   a gas evacuation system (214) operable to reduce an absolute pressure in the resin storage tank to below 100 mbar; and
   a chamber (330) inline between the flow control valve (208) and the resin storage tank (213), the chamber (330) having a smallest flow area $A_2$ which is at least 20 times a largest flow area $A_1$ of a duct portion (310) connecting the flow control valve (208) and the chamber (330) the process comprising:
   connecting a liquid resin source (201) to the resin inlet (202);
   pumping liquid resin into the first duct via the resin inlet (202) using the resin pump (203) to achieve a first absolute pressure of at least 1.6 bar in the first duct (205);
   configuring the resin pump (203) and/or the flow control valve (208) to achieve a first pressure drop across the flow control valve of at least 1.5 bar; and
   maintaining, using the gas evacuation system (214), a pressure in the storage tank (213) below 100 mbar at least partly concurrently with pumping resin into the first duct (205).

2. The process in accordance with claim 1, wherein the flow control valve (208) and/or the resin pump (203) are controlled so that an average resin transit time from an output (209) of the flow control valve (208) to the inlet (212) of the storage tank (213) is in the range 10-120 s.

3. The process in accordance with claim 1, wherein the second duct (311) is inline between the chamber (330) and the storage tank (213), said second duct (311) having a largest flow area $A_3$ which is at most $A_2/20$.

4. The process in accordance with claim 1, wherein the largest flow area $A_1$ is in the range 2-6 cm² and the smallest flow area $A_2$ is in the range 130-200 cm².

5. The process in accordance with claim 1, wherein a volume of the chamber (330) is in the range 5-50 L.

6. The process in accordance with claim 1, wherein the flow control valve (208) and/or the resin pump (203) are controlled so that an average resin transit time through the chamber (330) is in the range 10-120 s.

7. The process in accordance with claim 1, wherein the first absolute pressure is at least 3 bar.

8. The process in accordance with claim 1, wherein a flow rate of the liquid resin into the resin inlet is in the range 20-60 L per minute.

9. The process in accordance with claim 1, wherein the first absolute pressure is at least 4 bar, the first pressure drop is at least 3.5 bar, the absolute pressure in the storage tank is maintained below 50 mbar, and optionally a flow rate of resin at the resin inlet is in the range 20-60 L per minute.

10. The process in accordance with claim 1, wherein the storage tank has an outlet (220) coupled to an outlet pump (221) for outputting degassed resin during a first time period overlapping with the pumping of the liquid resin into the first duct.

11. The process in accordance with claim 10, wherein the resin pump (203) and/or the flow control valve (208) and/or the outlet pump (221) are controlled to maintain a substantially constant amount of degassed resin in the storage tank during the first time period.

12. The process in accordance with claim 11, wherein the system comprises measuring means for measuring a parameter representing an amount of degassed resin in the storage tank, and the system further comprises control means configured to receive measurements from the measuring means and control the resin pump (203) and/or the flow control valve (208) and/or the outlet pump (221) to maintain a substantially constant amount of degassed resin in the storage tank.

13. The process in accordance with claim 10, wherein the outlet (220) is in fluid communication with a manufacturing area where a fibre-reinforced composite part is being manufactured at least during the first time period.

14. The process in accordance with claim 1, wherein no gas is provided into the resin during the degassing process apart from the gas contained in the resin when pumped into the first duct (205).

15. The process in accordance with claim 1, wherein the liquid resin comprises at least one of: epoxy resin, polyurethane resin, polyester resin, unsaturated polyester resin, vinyl ester resin, thermosetting resin, and thermoplastic resin.

16. A process for degassing liquid resin, comprising:
   providing liquid resin into a first duct (205) to achieve a first absolute pressure of at least 1.6 bar in the first duct;
   passing the liquid resin from the first duct (205) to a second duct (211,311) through a flow control valve (208), wherein the first absolute pressure and the flow control valve (208) are configured to cause cavitation on a downstream side (209) of the flow control valve (208) at least when the first absolute pressure is at least 1.6 bar; and
   transferring the liquid resin to a storage tank in fluid communication with the second duct and maintaining an absolute pressure in the storage tank below 100 mbar.

17. A degassing system (200, 300) for degassing liquid resin, the degassing system comprising:
   a first duct (205) having a resin inlet (202) for receiving liquid resin to be degassed;
   a resin pump (203) for pumping liquid resin into the first duct (205) via the resin inlet (202);
   a flow control valve (208) arranged at a downstream end of the first duct (205), configured to control a flow rate of resin through the first duct and configured or configurable to provide a pressure drop of at least 1.5 bar across the flow control valve (208);
   a second duct (211, 311) in fluid communication with the first duct (205) via the flow control valve (208);
   a resin storage tank (213) having a resin storage tank inlet (212) in fluid communication with an outlet end of the second duct (211, 311);
   a gas evacuation system (214) operable to reduce an absolute pressure in the resin storage tank (213) to below 100 mbar; and a chamber (330) inline between the flow control valve (208) and the resin storage tank (213), the chamber (330) having a smallest flow area $A_2$ which is at least 20 times a largest flow area $A_1$ of a duct portion (310) connecting the flow control valve (208) and the chamber (330).

18. The system in accordance with claim 17, wherein the second duct (311) is inline between the chamber (330) and the storage tank (213) and has a largest flow area $A_3$ which is at most $A_2/20$.

19. A process for degassing a liquid resin in a degassing system, the degassing system comprising:
a first duct (205) having a resin inlet (202) for receiving liquid resin to be degassed;
a resin pump (203) for pumping liquid resin into the first duct (205) via the resin inlet (202);
a flow control valve (208) arranged at a downstream end of the first duct (205), configured to control a flow rate of resin through the first duct and configured or configurable to provide a pressure drop of at least 1.5 bar across the flow control valve (208);
a second duct (211, 311) in fluid communication with the first duct (205) via the flow control valve (208);
a resin storage tank (213) having a resin storage tank inlet (212) in fluid communication with an outlet end of the second duct (211, 311); and
a gas evacuation system (214) operable to reduce an absolute pressure in the resin storage tank to below 100 mbar,
wherein the flow control valve (208) and/or the resin pump (203) are controlled so that an average resin transit time from an output (209) of the flow control valve (208) to the inlet (212) of the storage tank (213) is in the range 10-120 s,
the process comprising:
connecting a liquid resin source (201) to the resin inlet (202);
pumping liquid resin into the first duct via the resin inlet (202) using the resin pump (203) to achieve a first absolute pressure of at least 1.6 bar in the first duct (205);
configuring the resin pump (203) and/or the flow control valve (208) to achieve a first pressure drop across the flow control valve of at least 1.5 bar; and
maintaining, using the gas evacuation system (214), a pressure in the storage tank (213) below 100 mbar at least partly concurrently with pumping resin into the first duct (205).

20. A process for degassing a liquid resin in a degassing system, the degassing system comprising:
a first duct (205) having a resin inlet (202) for receiving liquid resin to be degassed;
a resin pump (203) for pumping liquid resin into the first duct (205) via the resin inlet (202);
a flow control valve (208) arranged at a downstream end of the first duct (205), configured to control a flow rate of resin through the first duct and configured or configurable to provide a pressure drop of at least 1.5 bar across the flow control valve (208);
a second duct (211, 311) in fluid communication with the first duct (205) via the flow control valve (208);
a resin storage tank (213) having a resin storage tank inlet (212) in fluid communication with an outlet end of the second duct (211, 311); and
a gas evacuation system (214) operable to reduce an absolute pressure in the resin storage tank to below 100 mbar,
the process comprising:
connecting a liquid resin source (201) to the resin inlet (202);
pumping liquid resin into the first duct via the resin inlet (202) using the resin pump (203) to achieve a first absolute pressure of at least 1.6 bar in the first duct (205), wherein a flow rate of the liquid resin into the resin inlet is in the range 20-60 L per minute;
configuring the resin pump (203) and/or the flow control valve (208) to achieve a first pressure drop across the flow control valve of at least 1.5 bar; and
maintaining, using the gas evacuation system (214), a pressure in the storage tank (213) below 100 mbar at least partly concurrently with pumping resin into the first duct (205).

21. A process for degassing a liquid resin in a degassing system, the degassing system comprising:
a first duct (205) having a resin inlet (202) for receiving liquid resin to be degassed;
a resin pump (203) for pumping liquid resin into the first duct (205) via the resin inlet (202);
a flow control valve (208) arranged at a downstream end of the first duct (205), configured to control a flow rate of resin through the first duct and configured or configurable to provide a pressure drop of at least 1.5 bar across the flow control valve (208);
a second duct (211, 311) in fluid communication with the first duct (205) via the flow control valve (208);
a resin storage tank (213) having a resin storage tank inlet (212) in fluid communication with an outlet end of the second duct (211, 311); and
a gas evacuation system (214) operable to reduce an absolute pressure in the resin storage tank to below 100 mbar,
the process comprising:
connecting a liquid resin source (201) to the resin inlet (202);
pumping liquid resin into the first duct via the resin inlet (202) using the resin pump (203) to achieve a first absolute pressure of at least 1.6 bar in the first duct (205), wherein the liquid resin comprises at least one of: epoxy resin, polyurethane resin, polyester resin, unsaturated polyester resin, vinyl ester resin, thermosetting resin, and thermoplastic resin;
configuring the resin pump (203) and/or the flow control valve (208) to achieve a first pressure drop across the flow control valve of at least 1.5 bar; and
maintaining, using the gas evacuation system (214), a pressure in the storage tank (213) below 100 mbar at least partly concurrently with pumping resin into the first duct (205).

* * * * *